United States Patent [19]
Hanyu et al.

[11] Patent Number: 5,704,020
[45] Date of Patent: Dec. 30, 1997

[54] PAGE PRINTER RESOLUTION CONVERTING METHOD, AND VARIABLE-LENGTH REVERSIBLE COMPRESSION PROCESS

[75] Inventors: Yoshiaki Hanyu, Souka; Mutsuo Shimomae, Yokosuka, both of Japan

[73] Assignee: Ricoh Company, Ltd., Tokyo, Japan

[21] Appl. No.: 586,477

[22] Filed: Jan. 11, 1996

[30] Foreign Application Priority Data

Mar. 8, 1995 [JP] Japan ................... 7-048754

[51] Int. Cl.[6] ................................................ G06K 15/00
[52] U.S. Cl. .......................... 395/102; 395/114; 395/115
[58] Field of Search ............................. 395/101, 102, 395/109, 113, 112, 114, 128, 502, 503–506, 834, 876, 877, 894, 885; 358/404, 426, 261.2, 261.4, 428, 430, 431, 444, 449, 451

[56] References Cited

U.S. PATENT DOCUMENTS 5,206,741  4/1993  Shimura et al. ........................ 395/404
5,471,563  11/1995 Dennis et al. ........................ 395/114

OTHER PUBLICATIONS

PCL 5 Comparison Guide for Printers, Hewlett Packard No. 5961–0999, first edition, May 1993.
SoftBand High–Performance Low–Memory Imaging, Proprietary Information, Phoenix Technologies Ltd.

Primary Examiner—Arthur G. Evans
Attorney, Agent, or Firm—Lowe, Price, LeBlanc & Becker

[57] ABSTRACT

A page printer printing document data includes a first rasterizing part for rasterizing the document data with a first resolution and a data compression part for compressing each of blocks which form first rasterized data from the first rasterizing part to produce a compression code, and for storing the compression code in a compression memory. The page printer further includes a data decompression part for decompressing the compression code stored in the compression memory, and for transmitting decompressed data to a printer engine having the first resolution. A second rasterizing part rasterizes the document data again with a second resolution less than the first resolution when the compression code exceeds a given size. A resolution converting part in the page printer converts second rasterized data from the second rasterizing part to conversion data with the first resolution, and transmits the conversion data to the printer engine having the first resolution.

1 Claim, 14 Drawing Sheets

FIG. 7
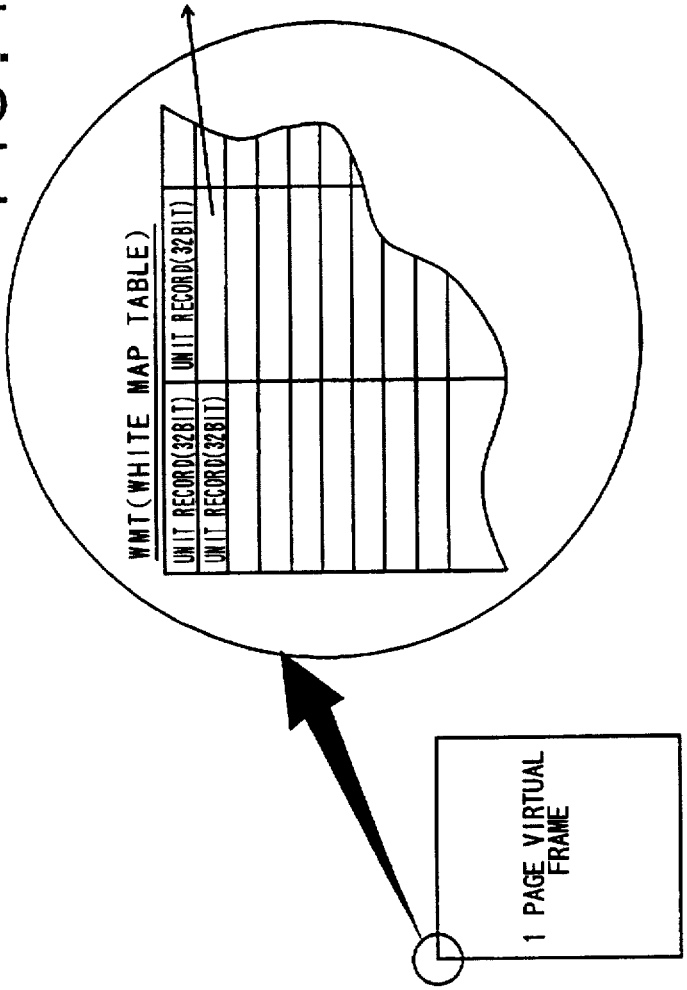
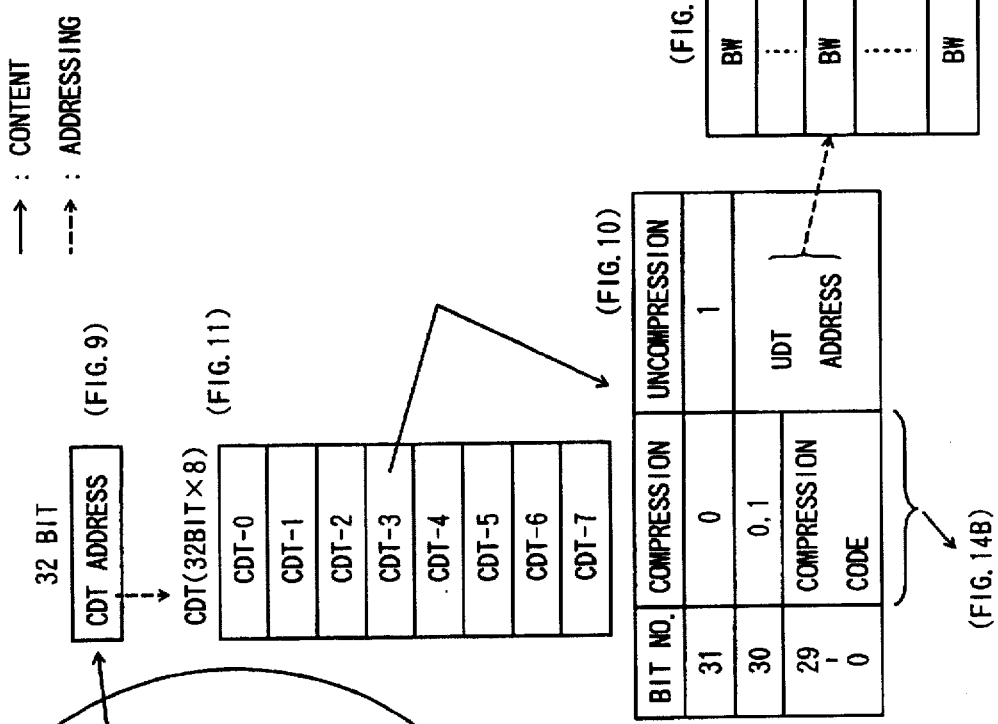

FIG. 8
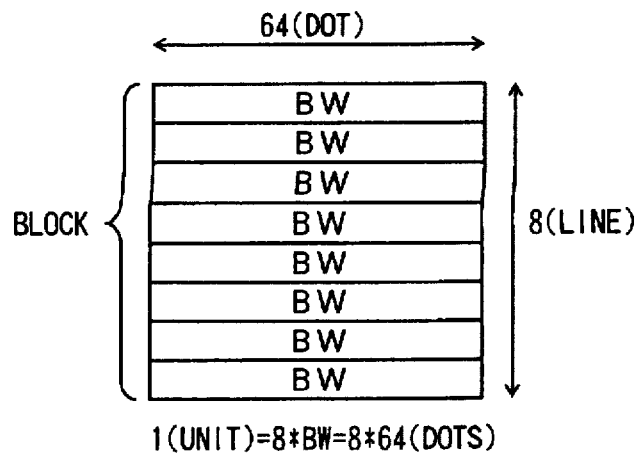
1(UNIT)=8*BW=8*64(DOTS)
FIG. 9
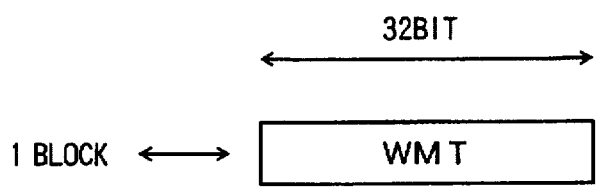
FIG. 10
| BIT NO. | PERFECT COMPRESSION | IMPERFECT COMPRESSION |
|---|---|---|
| 31 | 0 | 1 |
| 30 | 0 (WHITE DOT START) <br> 1 (BLACK DOT START) | UNCOMPRESSION DATA TABLE(UDT) ADDRESS IN IMPERFECT COMPRESSION |
| 29 ⟨ 0 | COMPRESSION CODE | |

| VALUE | #BITS | CODE DATA |
|---|---|---|
| 1 | 1 | '0' |
| 2, 3 | 3 | '10x' |
| 4~7 | 5 | '110xx' |
| 8~15 | 7 | '1110xxx' |
| 16~31 | 9 | '11110xxxx' |
| 32~63 | 11 | '111110xxxxx' |
| 64~127 | 13 | '1111110xxxxxx' |

(MSB) (LSB)
CDT = 0 0 1 1 1 0 0 1 0 1 1 1 0 1 1 0 1 1 1 0 0 1 1 1 1 1 1 1 0 0 0 1 1 (B)

⇓    ⇓    ⇓    ⇓
10   14   11   19

FIG.17A  FIG.17B
FIG.18
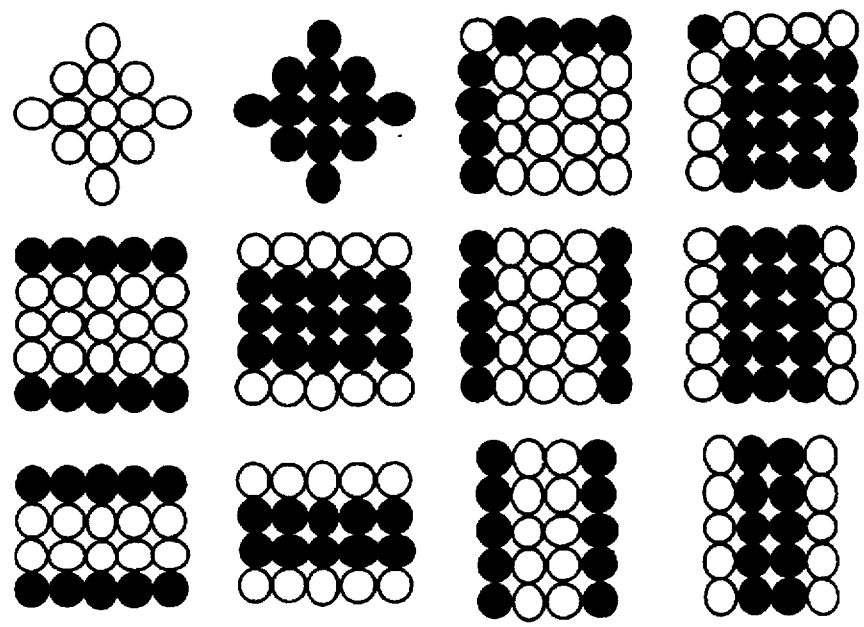
FIG.19
```
 0 -1  0
-1  4 -1
 0 -1  0
```

IMAGE A  IMAGE B

FIG.23A 1×1 TIMES
FIG.23B 2×2 TIMES
FIG.23C 2×4 TIMES
FIG.23D 3×3 TIMES
FIG.23E 3×6 TIMES

PAGE PRINTER RESOLUTION CONVERTING METHOD, AND VARIABLE-LENGTH REVERSIBLE COMPRESSION PROCESS

BACKGROUND OF THE INVENTION

1. Field of the Invention

The present invention generally relates to a page printer, a resolution converting method, and a variable-length reversible compression process, and more particularly, to a page printer such as a laser printer and an LED printer, a resolution converting method for achieving high image quality while reducing a memory capacity, and a variable-length reversible compression process for a bi-level image. The present invention is also directed to a printer part of a digital copy machine.

2. Description of the Related Art

Recently, resolution of a page printer such as a laser printer is increasing, and at present, a page printer of 600 dots/inch (DPI) is widely used. Therefore, a memory capacity of a frame buffer (page memory) in the page printer needs to be approximately 4 MB for an A4 paper with 600 DPI, and approximately 8 MB for an A3 paper with 600 DPI. Such increases of the memory capacity of the frame buffer have a large influence on product cost. However, the cost of the page printer is currently decreasing. Therefore, it is necessary to prevent the cost of the page printer from increasing due to improvement of the resolution.

For a reversible compression technique for bi-level image data, a variety of compression schemes are used. Widely used compression schemes include a modified Huffman (MH) coding scheme (one-dimensional compression scheme), a modified READ (MR) coding scheme (two-dimensional compression scheme), and a modified MR (MMR) coding scheme, which are used in a facsimile, etc., and a Lempel-Ziv (LZ) scheme which is usually used for a text file and a binary file in a computer. Furthermore, recently, a JBIG scheme using arithmetical coding which is internationally standardized is also used.

However, since these reversible compression techniques for the bi-level image data carry out a sequential coding process in sequence from a top of the image or the file, it is difficult to process only a desired area of the image or the file in real time.

In the computer, information of the image or the file is formed by a plurality of image information which are produced in selected areas on a CRT in sequence. Some of the image information may be produced in the same area as in a case of multiple windows. When the plurality of image information are transmitted to the page printer to be printed, they are transmitted in an order of the image information being sequentially produced. Therefore, to timely compress the plurality of the image information in the page printer, the image information in the desired area should be processed earlier. Accordingly, it is difficult to directly use the above-mentioned compression techniques for the page printer.

In other methods disclosed in publications "PCL 5 Comparison Guide for Printers", Hewlett Packard No. 5961-0999, first edition, May, 1993, and "SoftBand (registered trade mark) High-Performance Low-Memory Imaging", Proprietary Information, Phoenix Technologies Ltd., in the computer or the page printer, the plurality of image information are converted to a format which can be processed in sequence from a top of the file, whereby the above-mentioned compression techniques may be used. However, in this case, sometimes necessary memory capacity may overflow designed memory capacity, and, thus, the memory capacity may not be sufficiently reduced.

Further, at present, there is no fixed-length reversible compression technique for the bi-level image data in the world. Though the fixed-length compression technique may always reduce the memory capacity, this compression technique cannot recover an original resolution image (no reversible).

Accordingly, with the present compression techniques, any image data may not be compressed to a desired data amount.

SUMMARY OF THE INVENTION

It is an object of the present invention to provide a page printer. The cost of the printer can be reduced and the resolution of the printer can be improved while reducing the memory capacity of the frame buffer in the printer by using compression techniques.

It is another object of the present invention to provide a resolution converting method. By using the method, when bi-level image data is reversibly compressed by a block unit, even if the image data cannot be compressed to a desired data amount, the image data may be printed with an image quality level having a commonly-used resolution without increasing the memory capacity.

This permits the disadvantages described above to be eliminated.

The object described above is achieved by a page printer printing document data comprising: a first rasterizing part for rasterizing the document data with a first resolution; a data compression part for compressing each of blocks which form first rasterized data from the first rasterizing part to produce a compression code, and for storing the compression code in a compression memory; a data decompression part for decompressing the compression code stored in the compression memory, and for transmitting decompressed data to a printer engine having the first resolution; a second rasterizing part for rasterizing the document data again with a second resolution less than the first resolution when the compression code exceeds a given size; and a resolution converting part for converting second rasterized data from the second rasterizing part to conversion data with the first resolution, and for transmitting the conversion data to the printer engine having the first resolution.

According to the above-mentioned page printer, the document data to be printed is rasterized with the first resolution which is commonly used for printing, and is compressed. Therefore, a memory capacity may be reduced. Further, even if the document data cannot be compressed to a desired size, the document data is rasterized again with the second resolution less than the first resolution. The re-rasterized data is processed in the bi-level-to-multi-level conversion process. Therefore, this document data may be printed with the first resolution commonly used for printing.

The object described above is also achieved by a resolution converting method used in a page printer comprising the steps of: (a) carrying out a bi-level image area separating process for data which is rasterized with a second resolution; (b) carrying out a multi-level smoothing process for an area which is recognized as a character and line area to convert to a first resolution; (c) carrying out a quasi-multi-leveling process using a smoothing filter for another area which is not recognized as the character and line area to convert to multi-level data; and (d) converting the multi-level data in step (c) to data of the first resolution so as to print with the first resolution.

According to the above-mentioned resolution converting method, even if the document data cannot be compressed to a desired size, the document data may be printed with high resolution commonly used for printing by carrying out the resolution conversion according to kinds (image areas) of image data without increasing the memory capacity.

The object described above is also achieved by a variable-length reversible compression process for data compression of image data used in a page printer, the image data having a plurality of block units, each of which includes u block words in main and sub scanning directions, each of block words including t dots in the main scanning direction, the process comprising the steps of: (a) dividing a page buffer which is required for rasterizing the image data to a first resolution into several elements corresponding to the block units; (b) checking whether a content of one of the block units is all white, and storing a checking result in an m-bit white map table; and (c) preparing, when the content of the one of the block units is not all white, n-bit compression data tables for the u block words in an address area indicated by the white map table, and storing a result of compression process for each of the u block words in the n-bit compression data tables.

The object described above is also achieved by the process mentioned above, wherein the process further comprises the step of (d) preparing, when the compression process for one of the u block words is not perfected, a t-bit uncompression data table in an address area indicated by the compression data table, and storing the block word in the t-bit uncompression data table.

According to the above-mentioned variable-length reversible compression process, the rasterized bi-level image data may be processed in the reversible compression process for each block. Therefore, the rasterized bi-level image data of the document to be printed may efficiently be compressed.

Other objects and further features of the present invention will be apparent from the following detailed description when read in conjunction with the accompanying drawings.

BRIEF DESCRIPTION OF THE DRAWINGS

FIG. 7 shows an illustration for explaining a relationship of tables and data shown later in FIG. 9 to FIG. 14B;

FIG. 8 shows an illustration for indicating a configuration of one block unit of a PS file;

FIG. 9 shows an illustration for indicating size of a white map table (WMT) for each block unit;

FIG. 10 shows an illustration for indicating a configuration of a compression data table (CDT) being stored in the WMT shown in FIG. 9;

FIG. 17A and FIG. 17B show illustrations for indicating an example of a matching pattern of 3×3 pixels used in a line-number decision process shown in FIG. 16;

FIG. 18 shows an illustration for indicating an example of groups of white and black pixels which are detected in a halftone part detecting process shown in FIG. 16;

FIG. 19 shows an illustration for indicating an example of a Laplacian filter used in a quasi-multi-leveling process and a multi-level gray scale process shown in FIG. 15;

DESCRIPTION OF THE PREFERRED EMBODIMENTS

Figure 1:
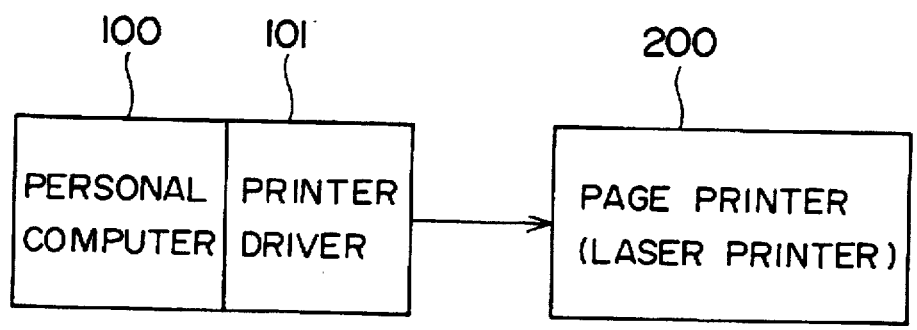
FIG. 1 shows a block diagram of an embodiment of an image producing system using a page printer according to the present invention.

First, a description will be given of a configuration embodiment of an image producing system using a page printer according to the present invention, by referring to FIG. 1. FIG. 1 shows a block diagram of the embodiment of the image producing system using the page printer according to the present invention. The image producing system is constructed with a personal computer 100 and a page printer 200. In the personal computer 100, a user commonly produces a document by using a CRT, a keyboard, and a desktop publishing (DTP) application, and transfers document data to the page printer 200 through a printer driver 101 accompanied with the personal computer 100 to print the document.

The printer driver 101 converts the document data to be published to a printer language which is supported in the page printer 200. For the printer language, PCL of Hewlett-Packard, and PostScript (registered trade mark) of Adobe system Inc., etc., are commonly used. A printer connected to the PCL is commonly called a PCL emulation printer, and a printer connected to the PostScript is commonly called a PostScript printer. Further, a dam printer is also known, which directly prints a bit image rasterized in the personal computer 100.

For the page printer 200, a laser printer, an ink-jet printer, a thermal printer, etc., are usable. Of these printers, for high-speed printing, the laser printer is superior. Recently, a color laser printer is also provided for commercial use, and is usable for the page printer 200. Further, a resolution of the page printer is increasing yearly, and a resolution of 600 DPI is currently used as a standard resolution.

In the following, the page printer 200 as a black-and-white PostScript laser printer with a resolution of 600 DPI (referred to as a printer, hereinafter) will be discussed. However, the present invention is not limited to the above printer.

Figure 2:
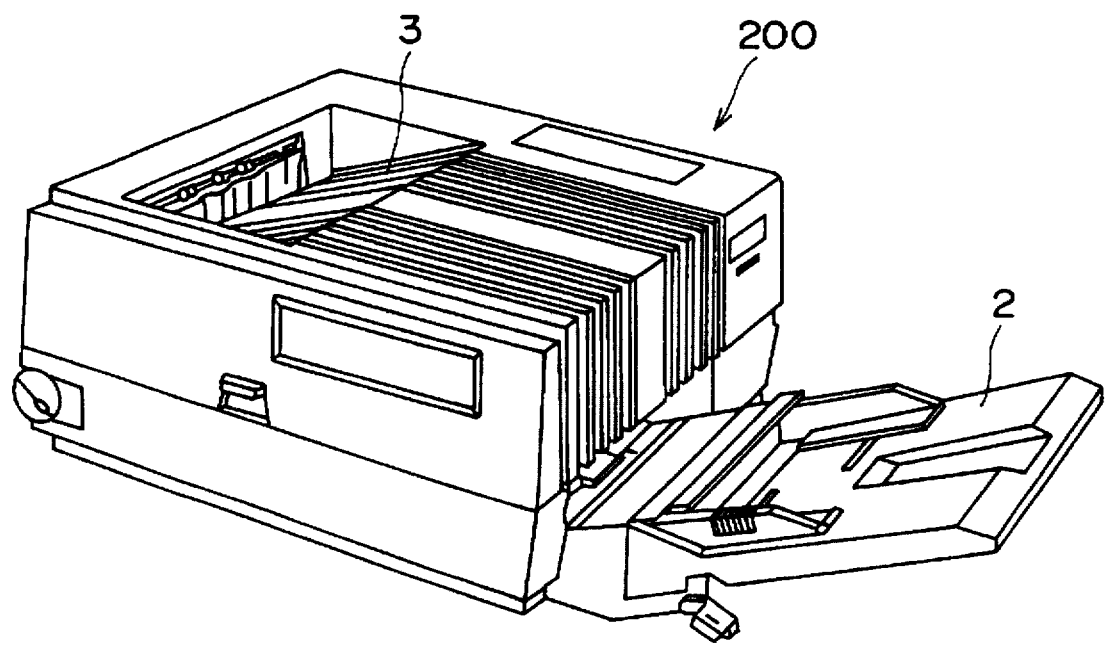
FIG. 2 shows an overall view of the page printer according to the present invention.
Figure 3:
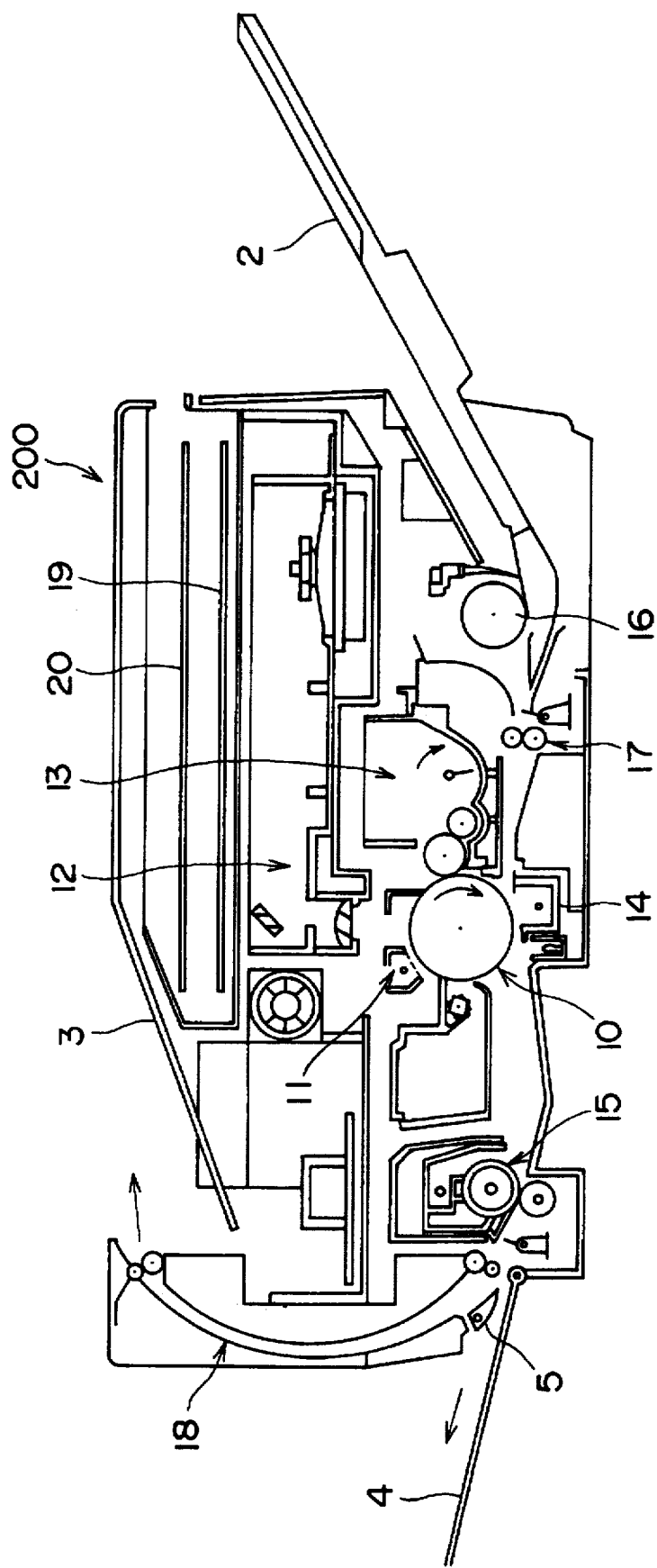
FIG. 3 shows a cross-sectional view for explaining an internal mechanism of the page printer shown in FIG. 2.

FIG. 2 shows an overall view of the page printer according to the present invention. FIG. 3 shows a cross-sectional view for explaining an internal mechanism of the page printer shown in FIG. 2.

In the printer 200 (corresponding to the page printer 200 shown in FIG. 1), a paper-feed tray 2 is detachably provided, a first paper-issue stacker 3 is provided in the top, and a second paper-issue stacker 4 is provided in a rear side. In the first and second paper-issue stackers 3, 4, to issue a paper, one of the two stackers 3, 4 can be selected by a selecting element 5. In normal use, the first paper-issue stacker 3 is selected as a paper-issue stacker. However, when an easily rolled paper such as an envelope and a postcard is used, the second paper-issue stacker 4 is selected.

Further, the printer 200 includes a photoconductor drum 10, a charging part 11, an optical writing part 12, a developing part 13, a transcribing part 14, and a fixing part 15, which construct an image producing part of a printer engine. The printer 200 further includes a paper feeding part having a paper-feed roller 16, a pair of resist rollers 17, etc., a transporting part for issuing a paper 18 having a transporting roller, a paper guide, etc. Further, a controller board 19 constructing a printer controller which controls the whole laser printer, and an engine driver board 20 constructing a sequence controller of the printer engine are also provided.

When the print sequence is started by the sequence controller of the printer engine, the paper-feed roller 16 starts to feed a paper from the paper-feed tray 2, and temporarily stops to feed the paper when a top end of the paper reaches the pair of the resist rollers 17.

On the other hand, the photoconductor drum 10 rotates in an arrow direction shown in FIG. 3, and a surface of the photoconductor drum 10 is charged by the charging part 11. And, to the charged surface a laser beam, which is modulated according to the image data from the printer controller by the optical writing part 12, is radiated and is scanned in a axial direction of the drum 10 to expose the surface. Then, an electrostatic image is provided on the surface of the photoconductor drum 10.

The electrostatic image provided on the surface is developed by toner in the developing part 13, and is transcribed to the paper which is fed at a given timing by the pair of the resist rollers 17 in the transcribing part 14. The printed paper is thermally fixed in the fixing part 15, and is issued to the second paper-issue stacker 4 or is issued to the upper-side first paper-issue stacker 3 through the transporting part for issuing a paper 18.

Figure 4:
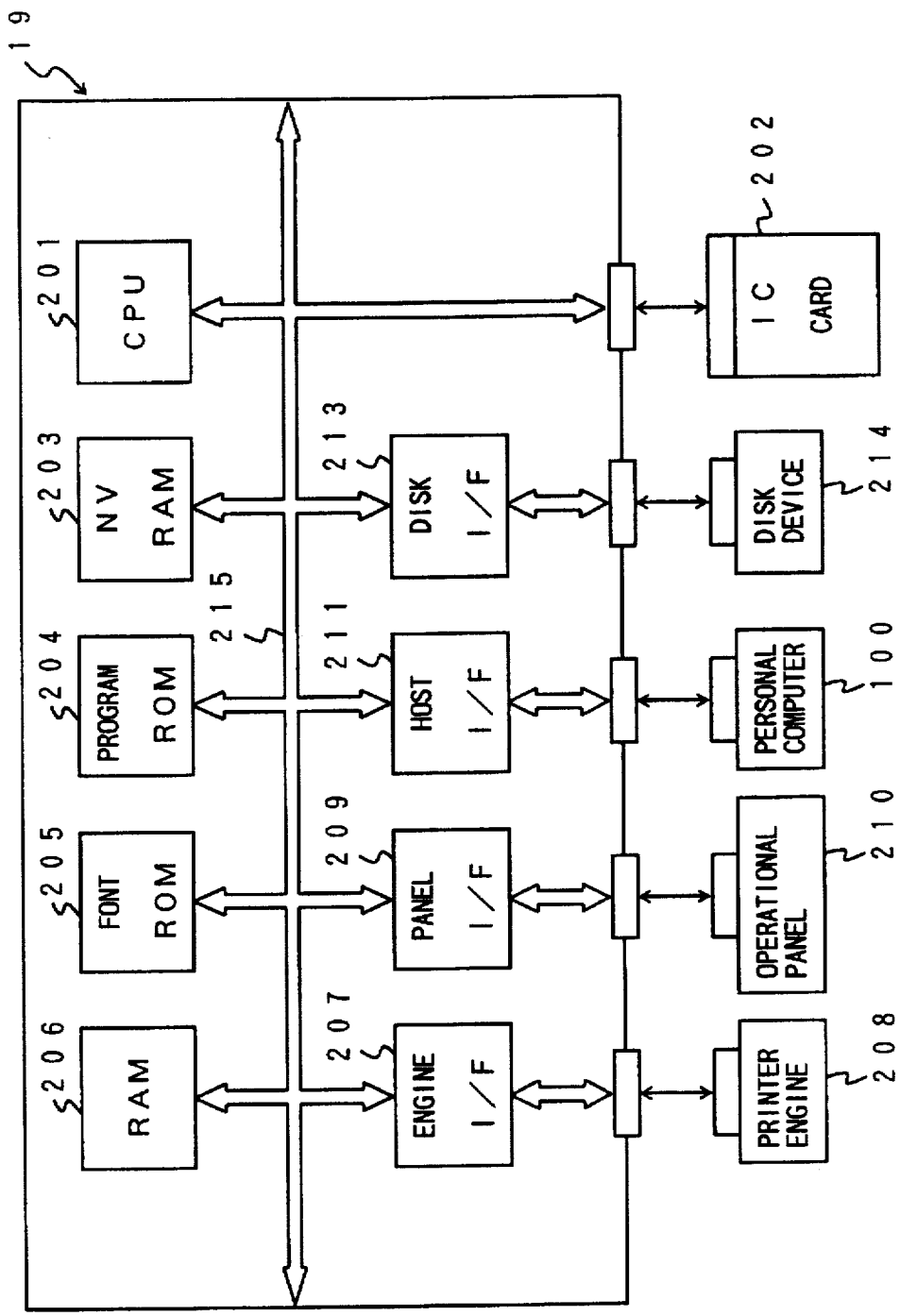
FIG. 4 shows a block diagram of a controller board shown in FIG. 3.

FIG. 4 shows a block diagram of the controller board 19 shown in FIG. 3. The controller board 19 is constructed with a CPU 201, an NVRAM 203, a program ROM 204, a font ROM 205, a RAM 206, four interfaces (I/F) 207 (engine), 209 (panel), 211 (host), 213 (disk), and a bus line 215 connecting these elements.

The CPU 201 controls the whole controller board 19 by a program stored in the program ROM 204, a mode instruction produced from an operation panel 210, and a command produced from the personal computer 100 as a host device, etc. Further, from an IC card mounted in the printer, font data and programs may also be provided.

The NVRAM 203 is a non-volatile storage device storing a content of the mode instruction produced from the operation panel 210.

The program ROM 204 is a read-only memory storing a control program of the controller board 19.

The font ROM 205 stores pattern data, etc., of a character font. The RAM 206 is a random access memory which is used as a work memory of the CPU 201, an input buffer of input data, a page memory of the print data (frame buffer), a memory for a downloaded font, etc.

The engine I/F 207 is connected to a printer engine 208 for actually printing a paper, and is an interface for communicating a command, a status, and print data with the printer engine 208.

The panel I/F 209 is connected to the operation panel 210, and is an interface for communicating a command and status with the operation panel 210. The operation panel 210 is a panel device for displaying a present printer condition to the user, and for the user inputting the mode instruction.

The host I/F 211 is an interface for communicating with the personal computer 100 of the host device. For the host I/F 211, a Centronics I/F and an RS232C are commonly used.

The disk I/F 213 is an interface for communicating with a disk device 214. The disk device 214 is an external storage device for storing the font data, the program, and any data such as print data. For the disk device 214, a floppy disk device and a hard disk device are usable.

In the following, an operation will be discussed of page printing in the printer 200, by referring to FIG. 5 and FIG. 6.

Figure 5:
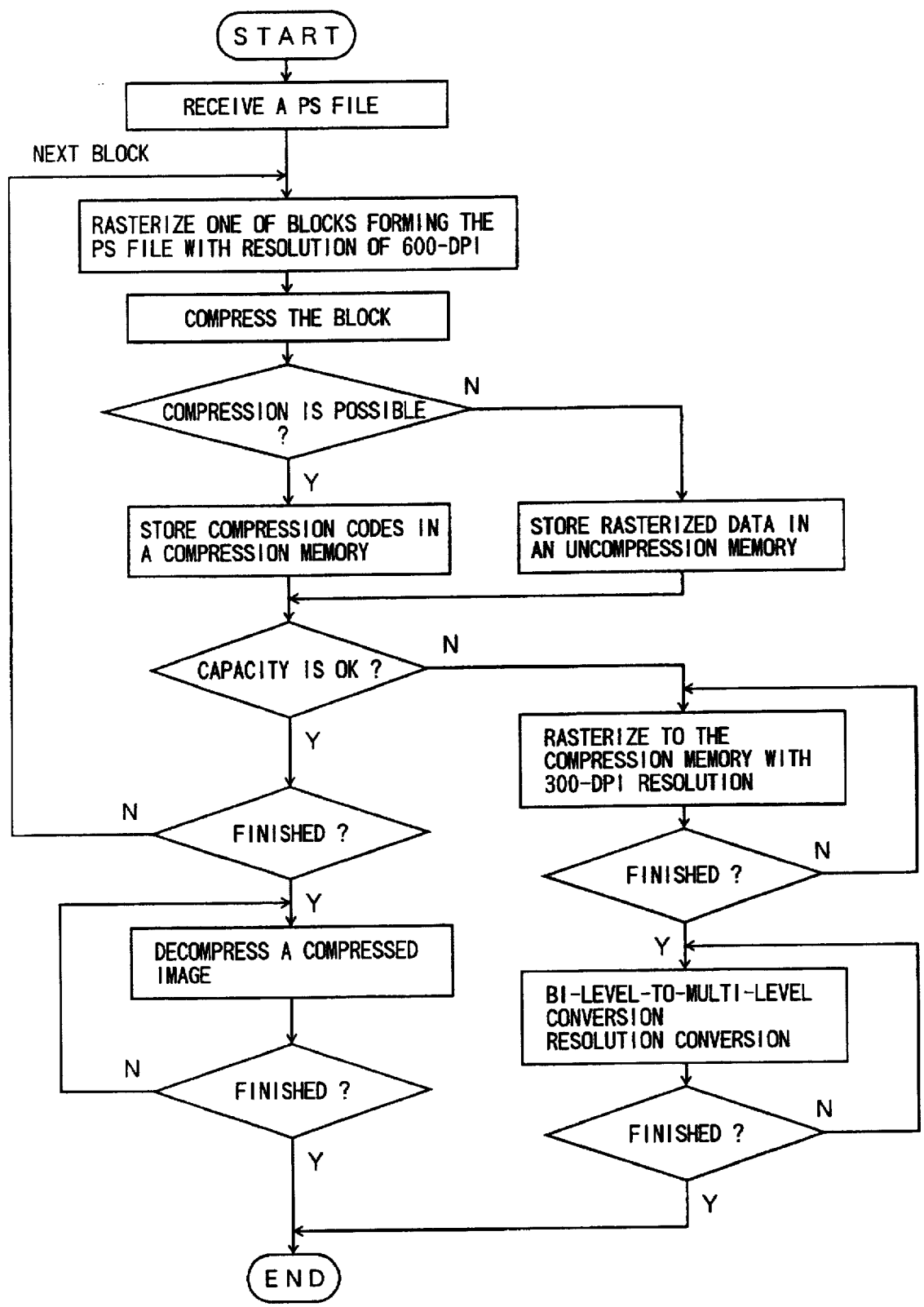
FIG. 5 shows an operational flow for printing one page using the printer shown in FIG. 2.

FIG. 5 shows an operational flow for printing one page using the printer 200. FIG. 6 shows a block diagram of a functional configuration related to the operational flow shown in FIG. 5. The operation of the page printing will be discussed along the operational flow shown in FIG. 5 by referring to FIG. 6.

The printer driver 101 in the personal computer 100 shown in FIG. 1 converts the document data to be printed to a PostScript (referred to as PS, hereinafter) file for every page, and transfers it to the printer (page printer) 200.

When the PS file is received in the printer 200, the PS file is partitioned into a plurality of blocks. In the printer 200, sequential processes are carried out for each block in an order of the blocks being produced.

Figure 6:
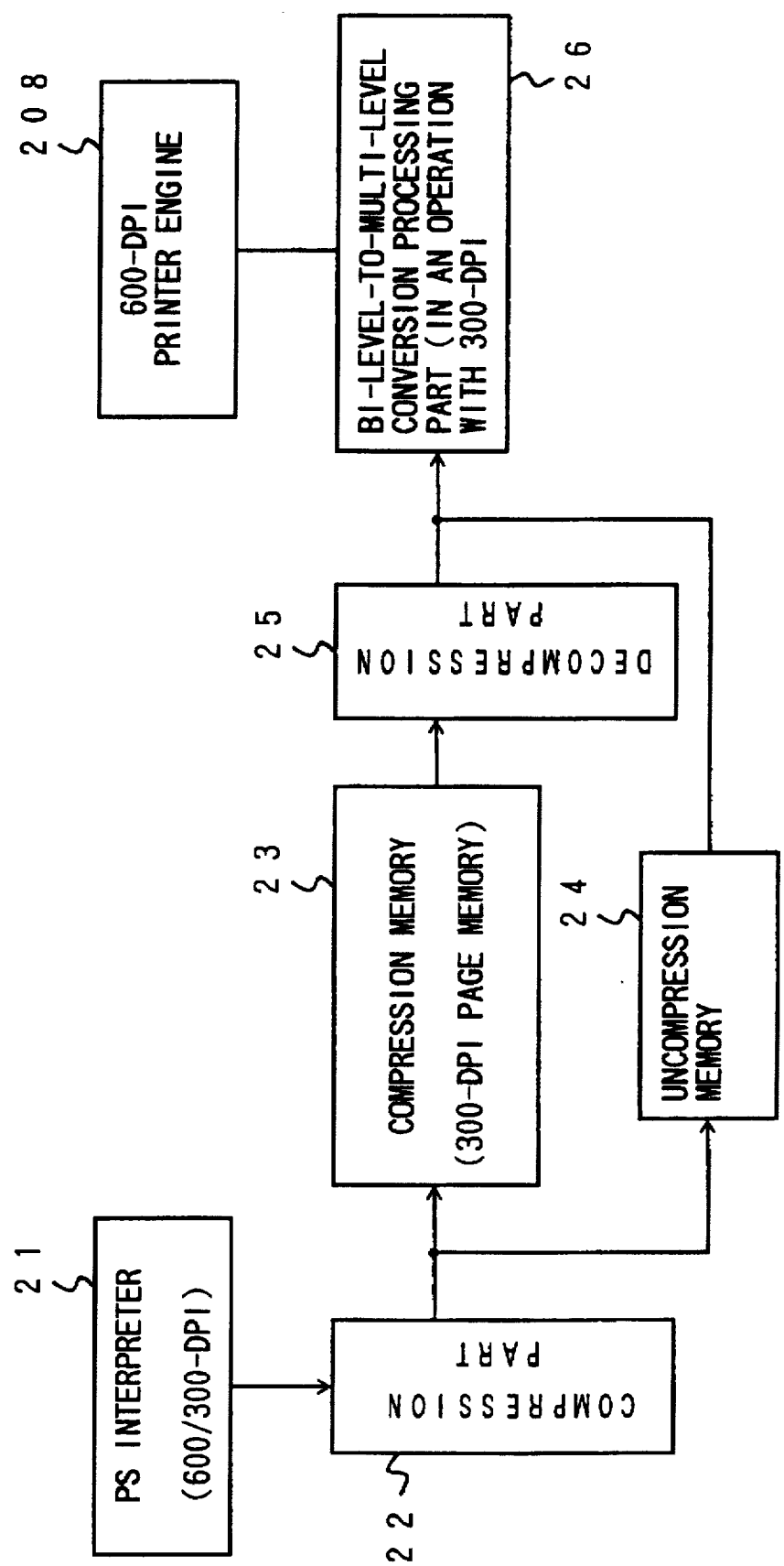
FIG. 6 shows a block diagram of a functional configuration related to the operational flow shown in FIG. 5.

A PS interpreter 21 shown in FIG. 6 rasterizes the PS file for a given block with a resolution of 600 DPI. In a compression part 22, a variable-length reversible compression process is carried out for the block to produce a compression code. When the compressing operation is perfected for the given block, the compression code is stored in a compression memory (300-DPI memory) 23.

When the compressing operation for a part of the block cannot be perfected, the rasterized data for the part of the block is stored in an uncompression memory 24. In practical use, since a single memory area of the RAM 206 shown in FIG. 4 may be used for both the uncompression memory 24 and the compression memory 23, it is not necessary to increase a memory capacity of the RAM 206.

When the process for all blocks of one page is finished, the compressed image stored in the compression memory 23 is decompressed from an upper left side of the page in a decompression part 25, and is transmitted to the printer engine 208 of 600 DPI to obtain a print result.

If before the process for one page is finished, data to be stored in the compression memory 23 and the uncompression memory 24 exceeds a given amount, the PS interpreter 21 rasterizes again the PS file with a resolution of 300 DPI. In this case, a bi-level-to-multi-level conversion process including resolution conversion is carried out in a bi-level-to-multi-level conversion processing part 26 to reproduce data with 600 DPI from data with 300 DPI. The data with 600 DPI is transmitted to the printer engine 208, and is printed there.

Accordingly, in this embodiment, the PS interpreter 21 shown in FIG. 6 may combine first and second rasterizing means, first rasterizing means for rasterizing the document data (PS file) to be printed with a first resolution (600 DPI) commonly used for the printing, and second rasterizing means for rasterizing the document data to be printed again with a second resolution (300 DPI) lower than the first resolution when the compression code produced from the first rasterizing means exceeds a given data size.

The compression part 22 is data compression means for carrying out the variable-length reversible compression process for a given unit of the data rasterized by the first rasterizing means, and for storing the compressed code as a result in the compression memory 23. The decompression part 25 is data decompression means for decompressing the compression code stored in the compression memory 23 and for transmitting decompressed data to the printer engine 208 of the first resolution.

The bi-level-to-multi-level conversion processing part 26 is resolution converting means for carrying out the bi-level-to-multi-level conversion process for the data which is rasterized by the second rasterizing means and is stored in the uncompression memory 24, and for transmitting the processed data to the printer engine 208 of the first resolution. [Compression process by a block unit]

Next, a description will be given of a first embodiment of the above-mentioned compression process by a block unit in the compression part 22, by referring to FIG. 7 to FIG. 14B.

FIG. 7 shows an illustration for explaining a relationship of tables and data shown later in FIG. 9 to FIG. 14B. FIG. 8 shows an illustration for indicating a configuration of one block unit of the PS file. FIG. 9 shows an illustration for indicating size of a white map table (WMT) for each block unit. FIG. 10 shows an illustration for indicating a configuration of a compression data table (CDT) being stored in the WMT shown in FIG. 9.

As shown in FIG. 8, for example, one block unit of the PS file is constructed with 8 block words (BW) (=8*64 dots), and as shown in FIG. 9, the 32-bit WMT is prepared for each block unit. When all data in the one block unit has only a white dot, the WMT is set to NULL (0xffffffff). On the other hand, when one or more black dots are present in the one block unit, the real address (CDT address) of the 32-bit compression data table shown in FIG. 10 is stored in the WMT.

Figure 11:
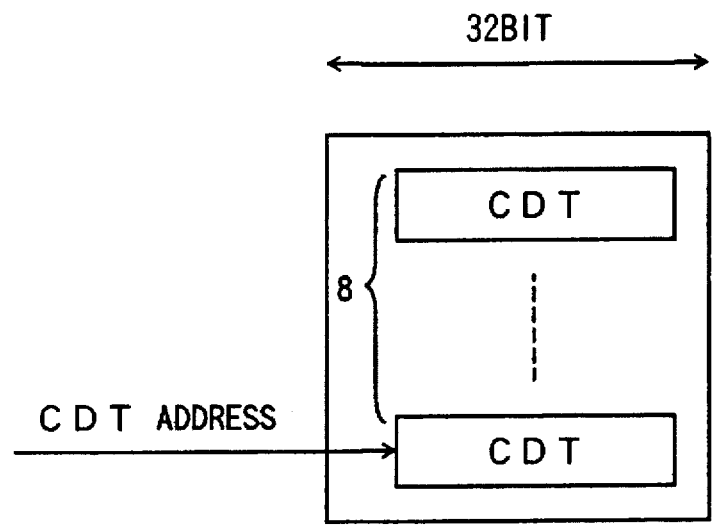
FIG. 11 shows an illustration of a configuration of a compression memory for storing the CDT for the block unit which is indicated by the CDT address stored in the WMT.
Figure 12:
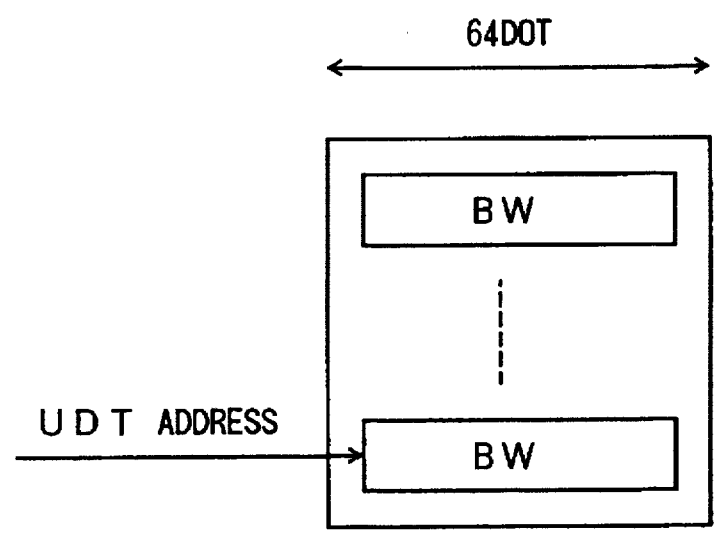
FIG. 12 shows an illustration of a configuration of an uncompression memory for storing the block words which is indicated by a data storage memory address (UDT address)

FIG. 11 shows an illustration of a configuration of the compression memory for storing the CDT for the block unit which is indicated by the CDT address stored in the WMT. FIG. 12 shows an illustration of a configuration of the uncompression memory for storing the block words which is indicated by a data storage memory address (UDT address). As shown in FIG. 11, the CDT area in the compression memory indicated by the CDT address is constructed with 8 CDTs (8*32 bits=32 bytes). Each CDT corresponds to one BW. When a later-mentioned compression method is tried, and when the compression is perfected for each block word, the compression code is stored in bit 29 to bit 0 as shown in FIG. 10. At that try, when the compression cannot be perfected for the block word, data "1" is set to bit 31, and the UDT address is stored in bit 30 to bit 0. The UDT address indicates an area in the uncompression memory in which uncompressed data, namely the block word, is stored as shown in FIG. 12.

The compression method used in the embodiment comprises the following two steps. In a first step, whether a block word to be processed has wholly white dots or wholly black dots is determined. In a second step, if the block word has wholly white dots or wholly black dots, the CDT is respectively set to 0x00000000 or 0x7fffffff. If not, according to whether a top dot of the block word is a white dot or a black dot (the top dot is indicated by the bit 30 shown in FIG. 10), for the following dots, a run length of white dots or black dots is described by using a Huffman code shown in FIG. 13.

Figures 13, 14A, 14B:
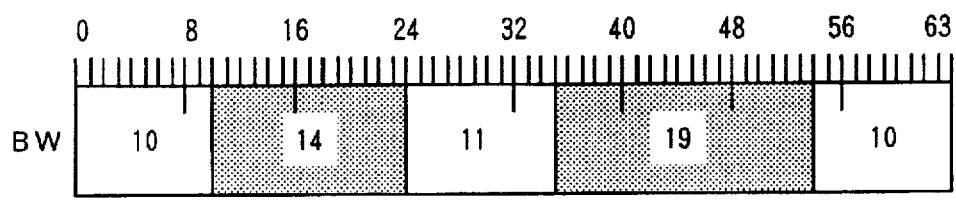
FIG. 13 shows an illustration for explaining a Huffman code describing a run length of a white dot or a black dot.
FIG. 14A and FIG. 14B show illustrations for indicating a conversion example of a compression code.

FIG. 14A and FIG. 14B show illustrations for indicating a conversion example of the compression code. For example, a block word of 64 dots shown in FIG. 14A is converted to the 32-bit compression code (indicating content of the CDT) shown in FIG. 14B. Though the last white dots (run length=10) are not included in the compression code, the last white dots may be recovered by a rule in that the dots following the last black dots (run length=19) are wholly white dots. Into a remaining area in the CDT, "1" is written. [Two-level-to-multi-level conversion process+Resolution conversion]

Next, a description will be given of the bi-level-to-multi-level conversion process and the resolution conversion, by referring to FIG. 15 to FIG. 21.

Figure 15:
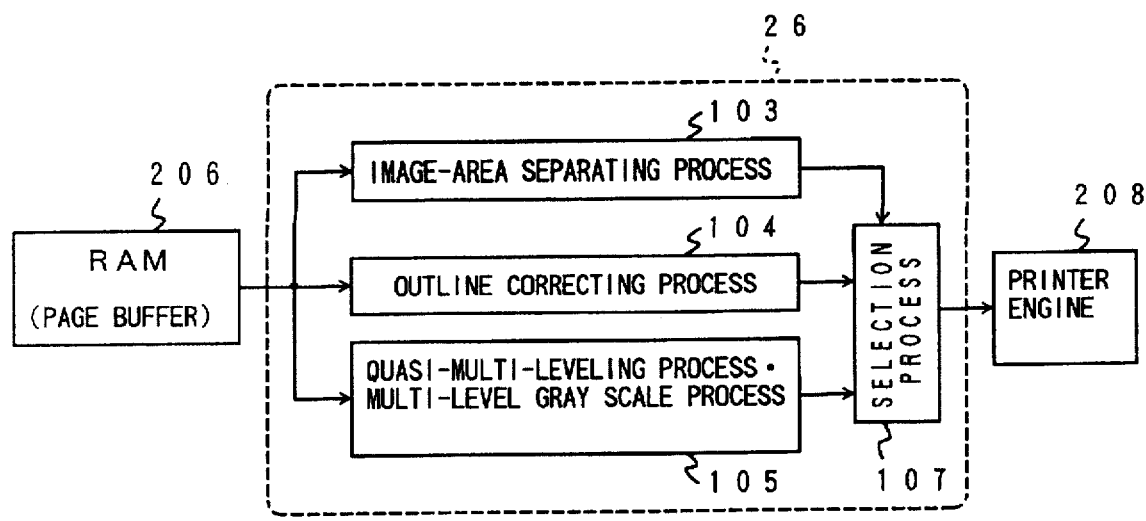
FIG. 15 shows a block diagram of a bi-level-to-multi-level conversion processing part of the printer 200.

FIG. 15 shows a block diagram of a bi-level-to-multi-level conversion processing part 26 of the printer 200 shown in FIG. 6. The bi-level-to-multi-level conversion processing part 26 is provided between the bi-level page buffer (page memory corresponding to the uncompression memory 24 shown in FIG. 6) in the RAM 206 of the printer 200 and the printer engine 208 (engine I/F 207, etc.). In the bi-level-to-multi-level conversion processing part 26, the bi-level-to-multi-level conversion process and the resolution conversion are carried out.

In the bi-level-to-multi-level conversion processing part 26, for the bi-level image data produced from the page buffer of the RAM 206, an image-area separating process 103, an outline correcting process 104, and a quasi-multi-leveling process and multi-level gray scale process 105 are carried out in parallel. For an area which is recognized as a graphic or a photograph image by the image-area separating process 103, a process result of the quasi-multi-leveling process and multi-level gray scale process 105 is selected by a selection process 107, and for the other area, a process result of the outline correcting process 104 is selected by the selection process 107, after the resolution conversion is carried out for each result. A selected one is produced to the printer engine 208.

In the following, the image-area separating process 103 will be discussed. In the image-area separating process 103, it is difficult in practice to separate the image area for a graphic having a small number of lines, a photographic image, a photographic character, and a net pattern commonly used in a figure, etc. Therefore, only a halftone image having a large number of lines (approximately more than 100 lines) is recognized. However, it is possible to change the lower limit of the line number.

Figure 16:
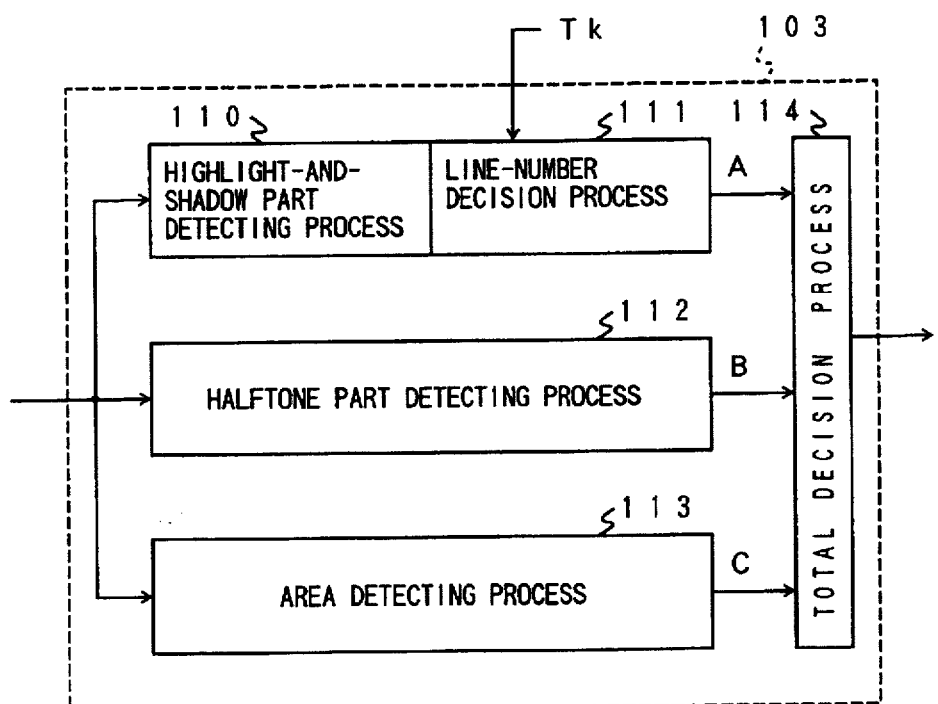
FIG. 16 shows a block diagram of an image-area separating process shown in FIG. 15.

FIG. 16 shows a block diagram of the image-area separating process 103 shown in FIG. 15. In the following, each function of the image-area separating process 103 will sequentially be discussed. [Highlight-and-shadow part detecting process 110 and Line-number decision process 111]

In a limited condition in that an output image is produced from a laser printer with an intermediate resolution, a single isolated dot is not present around a character nor a line image. And, for the graphic having the small number of lines and the photographic image, a given number of isolated dots are present in a given area. Therefore, by the highlight-and-shadow part detecting process 110, the isolated dot is detected and the highlight-and-shadow part in the areas of the graphic and the photographic image is detected.

In the line-number detecting process 111, the number of the isolated dots is counted, whereby the areas of only the graphic and the photographic image having a large number of lines are derived. FIG. 17A and FIG. 17B show illustrations for indicating an example of a matching pattern of 3×3 pixels used in the line-number decision process shown in FIG. 16. For detecting the isolated dot, for example, as shown in FIG. 17A and FIG. 17B, a matching process by the matching pattern of 3×3 pixels is used. The line-number decision process is carried out by detecting a pixel in which, for example, a condition Sx≧Tk is realized, where Sx is the number of the isolated dots in 9×9 pixels, and Tk is a threshold value. Next, a given expanding process is carried out for the detected pixel to produce a final result A.

An initial value of the Tk is 5, and the Tk changes according to the following equations.

| if (Sx < Tk) | then Tk+ = 2; |
| if (Sx = Tk) | then Tk+ = 1; |
| if (Sx > Tk) | then Tk = Tk; |
| if (Sx > Tk + 1) | then Tk− = 1; and |
| if (Sx > Tk + 2) | then Tk− = 2. |

By changing the Tk, the condition of the line-number decision may be changed. For example, by the document (application), it is possible to externally set the condition of the line-number decision. [Halftone part detecting process 112]

In a photographic image of the halftone part, there are groups of white pixels or black pixels, each group having a given size. As the number of lines increases, the size of the group decreases. Namely, by detecting groups more than the given size, and expanding them, a character, a line, a graphic having a small number of lines, and a photographic image may be detected. FIG. 18 shows an illustration for indicating an example of groups of white and black pixels which are detected in the halftone part detecting process shown in FIG. 16. In the halftone part detecting process 112, the pixel group more than the given size is detected, and is expanded to a desired size to produce a final result B. [Area detecting process 113]

In the area detecting process 113, by the expanding process to the desired size being carried out for an original image, the area detecting process is performed on the characters, the lines, the photographs, and graphic images in the document to produce information C. Based on the information C, a total decision process 114 is carried out. [Total decision process 114]

In the respective output results A, B, and C of the line-number decision process 111, the halftone part detecting process 112, and the area detecting process 113, when a pixel in which conditions of A=1 and B=0 are realized is present around a pixel in which C is a true "1", the pixel in which the conditions of A=1 and B=0 are realized is regarded as the graphic and photographic image having a large number of lines, and is expanded to the desired size.

By an experiment, the following fact is confirmed. In the above-mentioned image-area separating process 103, a rate of recognizing an image having a small number of lines such as an error diffusion process is larger than that of recognizing a bi-level image in a dither process and the halftone screen process.

Therefore, when the data cannot be compressed in the compression part 22 and the PS file is rasterized again with the resolution of 300 DPI in the PS interpreter 21, the image data is processed to become converted bi-level data by the error diffusion process. Further, since the error diffusion process may store the density of the original image with high precision, this process is also suitable for the later-mentioned quasi-multi-leveling process.

Figure 20:
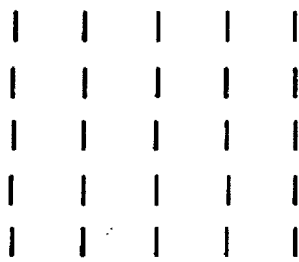
FIG. 20 shows an illustration for indicating an example of averaging filter size used in the quasi-multi-leveling process and the multi-level gray scale process shown in FIG. 15.
Figure 21:
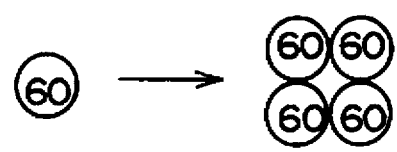
FIG. 21 shows an illustration for explaining a simple expanding method of 2×2 used in the quasi-multi-leveling process and the multi-level gray scale process shown in FIG. 15.

Next, a description will be given of the quasi-multi-leveling process and multi-level gray scale process 105 shown in FIG. 15. FIG. 19 shows an illustration for indicating an example of a Laplacian filter used in the quasi-multi-leveling process and multi-level gray scale process shown in FIG. 15. FIG. 20 shows an illustration for indicating an example of a process of averaging filter size used in the quasi-multi-leveling process and multi-level gray scale process shown in FIG. 15.

For example, based on edge strength by the Laplacian filter shown in FIG. 19, the averaging filter size shown in FIG. 20 is changed, and a multi dither process of 2×2, etc., is performed. When the image cannot be compressed and is rasterized with the resolution of 300 DPI, the rasterized image is expanded by using a simple expanding method of 2×2 shown in FIG. 21. After that, the multi-level dither process is carried out, and the image with resolution of 600 DPI may be recovered, in which degradation of the image quality may be reduced.

Namely, for an area except for the area of the characters and lines, the image is converted to multi-level data by the quasi-multi-leveling process with the smoothing filter, and is converted to the first resolution (600 DPI).

Next, descriptions will be given of the resolution conversion by the outline correcting process 104 shown in FIG. 15, and a multi-level smoothing process.

Figure 22:
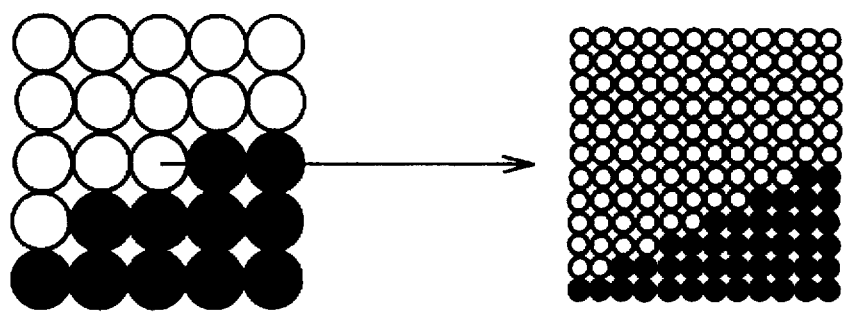
FIG. 22 shows an illustration for explaining an example of smoothing expansion for the resolution conversion by an outline correcting process shown in FIG. 15.
Figure 23:
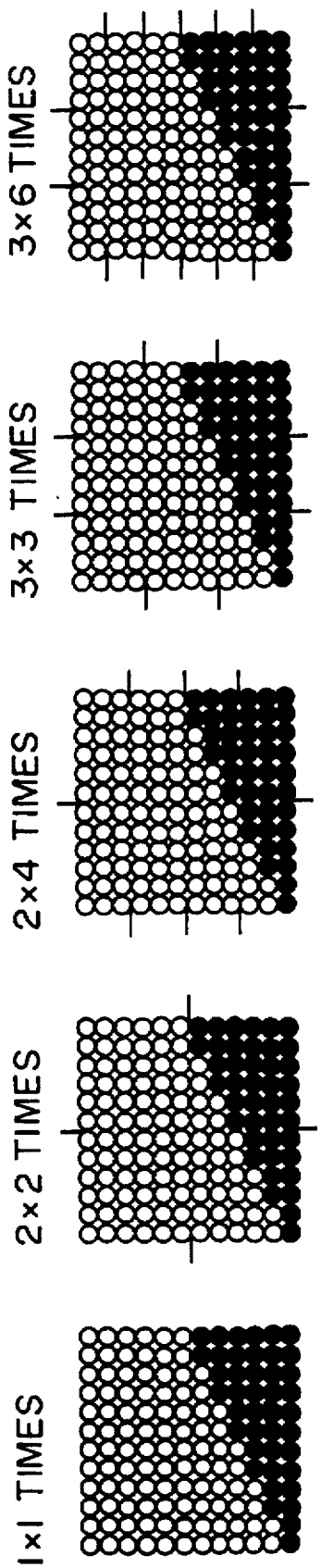
FIG. 23A to FIG. 23E show illustrations for explaining a smoothing process according to a expansion ratio in the outline correcting process.

For a method of converting the character and line image rasterized with the resolution of 300 DPI to the 600-DPI image, for example, a MOST technique is in practical use. In the following, a description of the MOST technique will be discussed by referring to FIG. 22 to FIG. 24. FIG. 22 shows an illustration for explaining an example of a smoothing expansion for the resolution conversion by the outline correcting process shown in FIG. 15. FIG. 23A to FIG. 23E show illustrations for explaining a smoothing process according to an expansion ratio in the outline correcting process.

In FIG. 22, by referring to adjacent pixels of the objective pixel to be converted (a central pixel shown in an image A of FIG. 22), the central pixel of the image A is smoothly expanded to an image B of 12×12 (dots) shown in FIG. 22. When a expanding ratio is 1×1, as shown in FIG. 23A, for the image B of the 12×12 dots (the number of black dots thereof being 42) shown in FIG. 22, the smoothing process of 12×12 is carried out to be normalized to the multi-level P of the printer. In this situation, the objective pixels are represented as follows:

$$42/(12\times12)\times P = 7/24P$$

When the expanding ratio is 2×2, as shown in FIG. 23B, the expanded pixels of 12×12 dots is partitioned into four groups of 6×6 dot pixels (the number of black dots in the partitioned areas is: 0 in an upper left area, 0 in an upper right area, 12 in a lower left area, and 30 in a lower right are). For each area, the smoothing process of 6×6 is carried out. In this process, the objective pixel is converted to a multi-level density of 2×2 dots, as follows:

$$0 / (6 \times 6) \times P = 0$$
$$0 / (6 \times 6) \times P = 0$$
$$12 / (6 \times 6) \times P = 1 / 3 \, P$$
$$30 / (6 \times 6) \times P = 5 / 6 \, P.$$

In the same way, when the expanding ratio is 2×4, as shown in FIG. 23C, the expanded pixels of 12×12 dots is partitioned into eight groups of 6×3 dot pixels. When the expanding ratio is 3×3, as shown in FIG. 23D, the expanded pixels of 12×12 dots is partitioned into nine groups of 4×4 dot pixels. When the expanding ratio is 3×6, as shown in FIG. 23E, the expanded pixels of 12×12 dots is partitioned into eighteen groups of 4×2 dot pixels. For each group, the smoothing processes of 6×3, 4×4, and 4×2 dots are respectively carried out.

Figure 24:
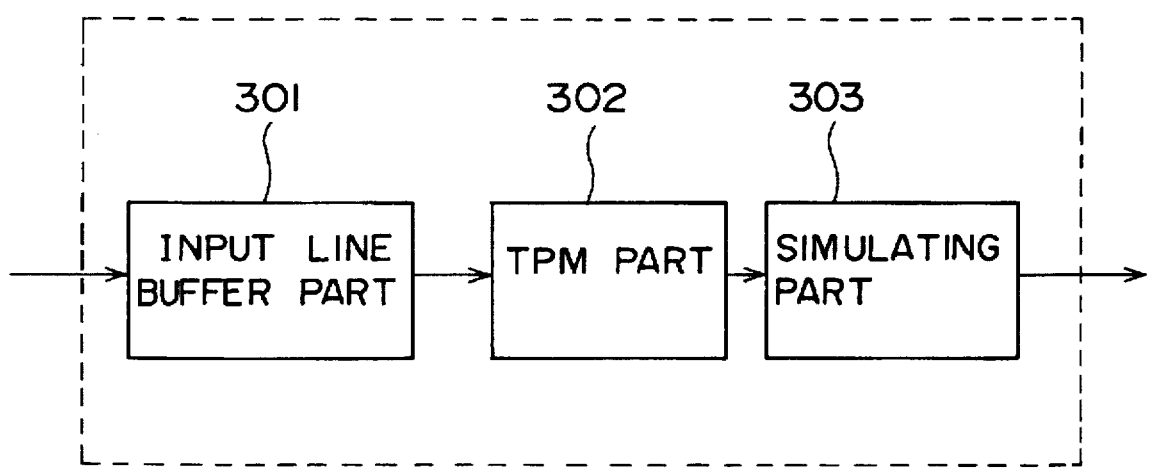
FIG. 24 shows a block diagram of a multi-level smoothing process part in the outline correcting process.

FIG. 24 shows a block diagram of a multi-level smoothing process part in the outline correcting process. The multi-level smoothing process part comprises an input line buffer part 301 for storing the adjacent pixels of the objective pixel, a TPM part 302 for smoothly expanding the adjacent pixels according to the expanding ratio, and a simulating part 303 for dividing and smoothing the result of the TPM part 302 according to the expanding ratio.

In this embodiment, by using a mode of the expanding ratio of 2×2 in the above process, the character and line image with the resolution of 300 DPI is processed in the multi-level smoothing process, and is converted to an image with the resolution of 600 DPI with jaggies removed.

Therefore, for the area which is recognized as the character and line image area by the image-area separating process 103 shown in FIG. 15, the area is smoothed with the multiple levels, and is converted to the first resolution (600 DPI).

As described above, the present inventions have the following features.

In the page printer according to the present invention, a memory capacity may be reduced by the data compression. Further, the document data which cannot be compressed to the desired size may be printed with the high resolution commonly used for normal printing.

In the resolution converting method according to the present invention, even if the document data cannot be compressed to the desired size, the document data may be printed with high resolution commonly used for normal printing without increasing the memory capacity.

In the above-mentioned variable-length reversible compression process according to the present invention, the rasterized bi-level image data may be processed in the reversible compression process for each block. Therefore, the rasterized bi-level image data of the document to be printed may efficiently be compressed.

Further, the present invention is not limited to these embodiments, but other variations and modifications may be made without departing from the scope of the present invention.

What is claimed is:

1. A page printer printing document data comprising:

first rasterizing means for rasterizing said document data with a first resolution;

data compression means for compressing each of blocks which form first rasterized data from said first rasterizing means to produce a compression code, and for storing the compression code in a compression memory;

data decompression means for decompressing said compression code stored in the compression memory, and for transmitting decompressed data to a printer engine having the first resolution;

second rasterizing means for rasterizing said document data again with a second resolution less than said first resolution when said compression code exceeds a given size; and resolution converting means for converting second rasterized data from said second rasterizing means to conversion data with said first resolution, and for transmitting the conversion data to said printer engine having the first resolution.

* * * * *